United States Patent [19]

Audureau et al.

[11] Patent Number: 4,818,467
[45] Date of Patent: Apr. 4, 1989

[54] PROCESS FOR COOLING A TUBULAR SLEEVE OF THERMOPLASTIC MATERIAL AND A DEVICE FOR MAKING USE THEREOF

[75] Inventors: Joel Audureau, Noeux les Mines; Brigitte Morese-Seguela, Bethune; Vincent Hervais, Bully les Mines, all of France

[73] Assignee: Societe Chimique des Charbonnages, societe anonyme, Paris la Defense, France

[21] Appl. No.: 30,615

[22] Filed: Mar. 27, 1987

[30] Foreign Application Priority Data

Mar. 28, 1986 [FR] France ................................ 86 04498

[51] Int. Cl.⁴ .............................................. B29C 47/88
[52] U.S. Cl. .................................... 264/564; 264/569; 425/72.1; 425/326.1
[58] Field of Search ............. 264/569, 564; 425/72 R, 425/326.1, 72.1

[56] References Cited

U.S. PATENT DOCUMENTS

| 3,307,218 | 3/1967 | Reifenhauser | 425/72 R |
| 3,548,042 | 12/1970 | Hinrichs | 425/72 R |
| 4,272,231 | 6/1981 | Schott, Jr. | 425/72 R |
| 4,447,387 | 5/1984 | Blakeslee et al. | 425/72 R |
| 4,472,343 | 9/1984 | Kawamura et al. | 425/326.1 |
| 4,505,657 | 3/1985 | Ikeya | 425/72 R |
| 4,624,823 | 11/1986 | Audureau et al. | 264/569 |
| 4,626,397 | 12/1986 | Bose | 425/72 R |
| 4,632,801 | 12/1986 | Dowd | 425/72 R |

FOREIGN PATENT DOCUMENTS

| 2259732 | 6/1974 | Fed. Rep. of Germany | 264/569 |
| 61-68224 | 4/1986 | Japan | 425/72 R |
| 444683 | 10/1974 | U.S.S.R. | 264/569 |

Primary Examiner—Jeffery Thurlow
Attorney, Agent, or Firm—Finnegan, Henderson, Farabow, Garrett & Dunner

[57] ABSTRACT

Process and device for cooling a tubular sleeve produced by hot extrusion-blowing of a thermoplastic material through an annular die. In the process, a stream of primary air is flowed under pressure substantially parallel to and spaced from the tubular sleeve and reaches the tubular sleeve at a second stage. The stream of primary air induces a stream of secondary air which flows substantially parallel and proximate to the tubular sleeve at a first stage and whose flow is substantially laminar over most of its path. The device includes a first cylindrical sleeve member that, in combination with the tubular sleeve, defines a secondary air flow space. A second cyclindrical sleeve member and the first sleeve member define a primary air flow space therebetween. A cylindrical ring disposed proximate to the annular die directs air into the secondary air flow space. A source of pressurized air is in flow communication with the primary air flow space.

12 Claims, 1 Drawing Sheet

SINGLE FIGURE

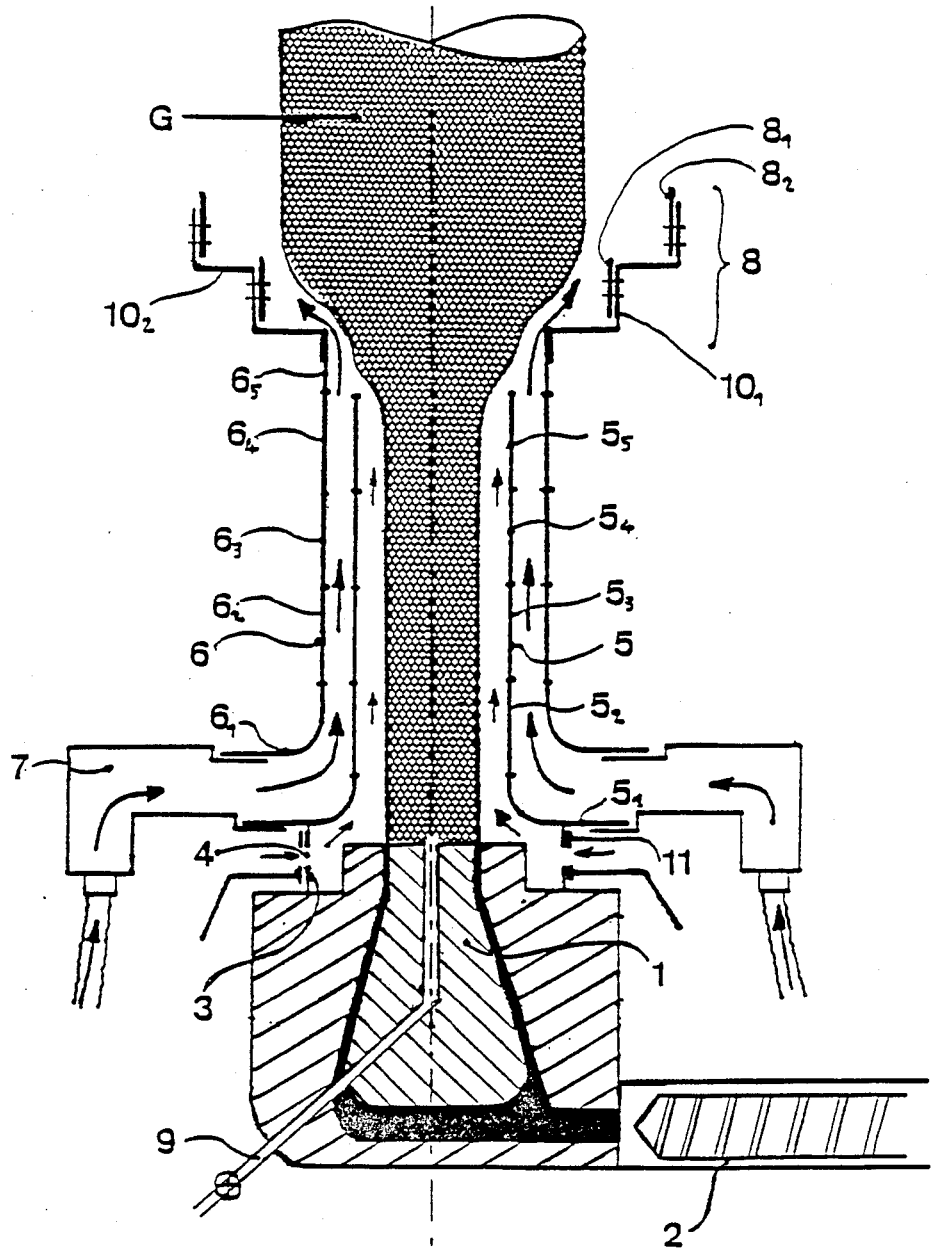
SINGLE FIGURE

PROCESS FOR COOLING A TUBULAR SLEEVE OF THERMOPLASTIC MATERIAL AND A DEVICE FOR MAKING USE THEREOF

FIELD OF THE INVENTION

The present invention relates to a process for cooling a tubular sleeve of thermoplastic material and a device for making use thereof.

BACKGROUND OF THE INVENTION

It is already known to cool a tubular sleeve of thermoplastic material originating from an annular extrusion-blowing die through which the molten material is flowing, the said tube being, in the initial phase of its cooling, in the shape of a cylinder whose diameter is substantially equal to that of the die.

Thus, patents EP-A No. 0,041,803 and EP-A No. 0,077,661 describe devices which have, in common, a closed low cylindrical chamber surrounding the tube as it leaves the die and a blowing ring directing the cooling air at right angles to the tube as it leaves the low chamber. In the first patent mentioned the device additionally comprises a high chamber placed on the blowing ring and directing the air tangentially to the tube after the latter is inflated. The high chamber described in the second document mentioned has the particular feature of not being joined to the blowing ring and thus enabling an additional induced air current to enter.

Document FR-A No. 1421490 describes a device comprising a rotating ring for blowing air, immediately located at the exit of the die and, intercalated between this ring and the tubular web to be cooled, a collar deflecting the cooling air tangentially to the tube. Document U.S. Pat. No. 3,307,218 describes an apparatus comprising a vertical cylindrical sleeve surrounding the tube when it has reached its greatest diameter and provided with a device making it possible to blow air in a parallel direction to the tube so as to cool it below its deformation temperature.

Patent EP-A No. 0,130,909 describes a device comprising, in its intermediate section, an intensive blowing ring whose current is directed towards the tube and, in its upper section, a high chamber in which the tube is in contact with the current of air directed towards the tube haul-off. In its lower section the device additionally comprises an unclosed low chanber provided with at least one opening.

The devices described in the first two documents mentioned have the disadvantage of being capable of improving the optical properties of the film produced from the tube only in the case of thermoplastic materials which already lead to films whose optical properties are already relatively satisfactory when produced with the aid of a traditional cooling system.

The last document mentioned describes a device which makes it possible to overcome this disadvantage. In practice, however, it has been noted that very slight faults could appear in the films produced from the tube, such as a slight thickness nonuniformity.

The purpose of the process and of the device according to the invention is to improve the thickness uniformity of the tube while maintaining, or even improving, its optical properties.

SUMMARY OF THE INVENTION

A subject of the present invention is a process for cooling a tubular sleeve produced by hot extrusion-blowing of a thermoplastic material through an annular die, the said tube being, in a first stage, in the shape of a cylinder with a diameter substantially equal to that of the die, in a second stage substantially in the shape of a conical frustum and in a third stage in the shape of a cylinder with the same axis as that of the first stage and with a diameter greater than the latter, with the process employing a stream of primary air under pressure and a stream of secondary air induced by the said stream of primary air, the said stream of primary air reaching the tube during the second stage, which process is characterized in that the induced stream of secondary air is parallel to the tube during the first cooling stage, travels in the same direction as the latter and is laminar over most of its path.

Another subject of the present invention is a device for making use of the process described above, comprising an annular die (1) arranged at the end of an extruder (2), characterized in that it additionally comprises a cylindrical ring (3) comprising at least one orifice (4) the opening of which is adjustable, placed on the said die coaxially with the latter, a first cylindrical sleeve (5) coaxial with the die (1) and resting on the ring (3), and a second cylindrical sleeve (6) coaxial with the first and with a diameter greater than the latter, the space between the first and the second sleeve being provided, in its lower part, with at least one device (7) for connecting to a source of air under pressure.

Additional objects and advantages of the invention will be set forth in part in the description that follows, and in part will be obvious from the description or may be learned by practice of the invention. The objects and advantages of the invention may be realized and attained by means of the procedures and combinations particularly pointed out in the appended claims.

DESCRIPTION OF THE PREFERRED EMBODIMENTS

A subject of the present invention is a process for cooling a tubular sleeve produced by hot extrusion-blowing of a thermoplastic material through an annular die, the said tube being, in a first stage, in the shape of a cylinder with a diameter substantially equal to that of the die, in a second stage substantially in the shape of a conical frustum and in a third stage in the shape of a cylinder with the same axis as that of the first stage and with a diameter greater than the latter, with the process employing a stream of primary air under pressure and a stream of secondary air induced by the said stream of primary air, the said stream of primary air reaching the tube during the second stage, which process is characterized in that the induced stream of secondary air is parallel to the tube during the first cooling stage, travels in the same direction as the latter and is laminar over most of its path.

The thermoplastic material is chosen in particular from low density polyethylene produced by a radical route, copolymers of ethylene with polar comonomers such as vinyl acetate, esters of acrylic and methacrylic acids, maleic anhydride, carbon monoxide, as well as the copolymers of ethylene with α-olefins containing from 3 to 12 carbon atoms produced by Ziegler catalysis and known also as linear low density polyethylenes. It is also possible to use various mixtures of these polyethylenes and copolymers, provided, as is well known to the expert, that their melt index, measured according to the ASTM standard D 1238-73 at 190° C. under a 2.16 kg load is between 0.1 and 10 dg/min.

The primary air stream, which is generally at ambient temperature, reaches the tube during the second stage of its cooling, that is to say at the time when its diameter changes from a value which is substantially equal to the die diameter to a value corresponding to the final diameter, which is a function of the blow-up ratio. The angle between the primary air stream and the tube wall may be between 90° and 0°, the movement of this stream taking place in the direction in which the tube is hauled off.

The secondary air stream, induced by the primary air stream, reaches the tube in its first stage of cooling, advantageously as close as possible to the extrusion die.

During the first stage of cooling, the ratio of the length to the diameter of the cylinder formed by the tube is advantageously between 1 and 10, more advantageously between 2 and 7, and preferably of approximately 4.

Advantageously, the induced stream of secondary air is laminar over at least 80% of its path. This means that some eddies may exist in the air stream but that they are limited and restricted to the region of the extrusion die exit. The volume ratio of the induced secondary air stream to the primary air stream is advantageously between 0.01 and 0.2 Advantageously, the secondary air stream rejoins the primary air stream at the time when the tube widens out. In this case, the combined stream of primary air and of induced secondary air is then advantageously channelled towards the tube during the third stage of cooling.

The process according to the invention makes it possible to obtain films which exhibit greater thickness uniformity while retaining the good optical properties obtained with the aid of the device according to document EP-A No. 0,130,909.

Another subject of the present invention is a device for making use of the process described above, comprising an annular die (1) arranged at the end of an extruder (2), characterized in that it additionally comprises a cylindrical ring (3) comprising at least one orifice (4) the opening of which is adjustable, placed on the said die coaxially with the latter, a first cylindrical sleeve (5) coaxial with the die (1) and resting on the ring (3), and a second cylindrical sleeve (6) coaxial with the first and with a diameter greater than the latter, the space between the first and the second sleeve being provided, in its lower part, with at least one device (7) for connecting to a source of air under pressure.

The assembly consisting of the annular die (1) and the extruder (2) is well known to the expert. Through the annular die there passes a conduit (9) enabling pressurized air to be blown into the tube, at a preselected height, so as to inflate the tube.

The opening of the orifice (4) of the cylindrical ring (3) can be adjusted by any known means such as a slide valve, also cylindrical in shape. In order to permit induced air to enter, the outermost position of the device for shutting off the orifice (4) is such that a light air stream can enter the device.

The first cylindrical sleeve (5), of which the height is at least equal to the diameter, advantageously between 1 and 10 times, better between 2 and 7 times and, preferably, of approximately 4 times the diameter, rests on the ring (3) coaxially with the die (1). The connection is advantageously leakproof and can be made by welding or brazing. The two components (3) and (5) may also consist of a single integral component produced directly by machining.

The first (5) and second (6) cylindrical sleeves may consist of a single component. Advantageously, they consist of several sections. The lower section of the sleeve (5) may be made integral with the ring (3); the intermediate and upper members of the sleeve (5) then advantageously consist of cylinders capable of fitting into each other and built up in succession on this lower section.

In order to enable the plant to be readily disassembled, one or other of the two sleeves (5) and (6), or both of them, are advantageously provided with a device enabling them to be opened along a generatrix. In this case, this involves, therefore, two half-cylinders connected, on the one hand, by means of a hinge, for example, and, on the other hand, by means of a fastener. When both the first (5) and the second (6) sleeves consist of cylinders capable of fitting into each other, each cylinder can thus be equipped with a device for opening along a generatrix.

The upper end of the sleeve (5) is situated at the height where the tube of thermoplastic material enters the second cooling stage, that is to say begins to widen out. In order to prevent the tube falling under the action of gravity, the upper end of the sleeve (6) is preferably situated at a height which is greater than that of the upper end of the sleeve (5), the imaginary surface defined by the upper ends of the two sleeves forming a conical frustum enclosing the tube during the second cooling stage.

According to an alternative form of the invention, the upper end of one of the sleeves (5) and (6), or of both, is in the shape of a conical frustum widening upwards.

Advantageously, another alternative form of the invention consists in placing (for example inserting) a baffle (8) on the upper end of the sleeve (6). A baffle means a device whose purpose is to channel the combined stream of primary and induced secondary air along the tube during the beginning of the third cooling stage. It may involve a sleeve in the shape of a conical frustum widening upwards, extended or otherwise by means of a cylindrical sleeve whose diameter is greater than that of the tube during the third stage.

It may also involve a device comprising a succession of cylindrical rings of increasing diameters arranged coaxially with the die, with the low section of a ring of given diameter encroaching or otherwise on the high section of the ring situated immediately below. According to an alternative form, at least one ring, preferably each ring, is connected to the upper ring by a plane surface.

According to another preferred alternative form, the rings are connected to each other and to the upper part of the sleeve (6) by at least two "staircase"-shaped fastening straps (10) comprising vertical oblong orifices for inserting fastening screws enabling the rings to be adjusted in height. According to this alternative form, a light stream of air travels vertically upwards between each ring.

The device according to the invention may additionally be provided with an internal cooling device such as that described in FIG. 2 of document EP-A No. 0,130,909. In this case, the sleeves (5) and (6) consist of members which are preferably capable of fitting into each other and which can be opened along a generatrix.

The invention will now be explained with the aid of the attached single FIGURE.

The particular device illustrating an alternative, non-limiting form of the invention and shown in the attached figure, comprises:

an annular die (1) arranged at the end of the extruder (2) and comprising a tube inflation line (9), a cylindrical ring (3) comprising several orifices (4) whose opening is capable of being simultaneously adjusted by means of a slide valve device comprising a cylindrical ring (11), itself perforated. The motion of the ring (11) is limited by stops so that the orifices (4) are never completely closed, a first cylindrical sleeve (5) consisting of a base ($5_1$) and of four cylinders capable of fitting into each other ($5_2$, $5_3$, $5_4$ and $5_5$), a second cylindrical sleeve (6) consisting of a base ($6_1$) and of four cylinders capable of fitting into each other ($6_2$, $6_3$, $6_4$ and $6_5$), a device for feeding pressurized air (7) into the space situated between the sleeves (5) and (6), and a baffle (8) comprising two cylindrical rings ($8_1$, $8_2$) connected to each other and to the upper cylinder ($6_5$) by means of two "staircase"-shaped fastening straps ($10_1$, $10_2$).

The tube of thermoplastic material is shown diagrammatically by the reference mark G.

After starting up (hauling off the beginning of the tube, threading between the nip rolls, not shown, and inflation of the tube), the device operates continuously in the following manner. A stream of primary air is introduced under pressure through the feed device (7). It passes through the space between the sleeves (5) and (6) and reaches the tube at the time when the latter widens out. The exit of the primary air stream induces, by suction, a secondary air stream which enters through the orifices (4) the space situated between the tube and the sleeve (5). The secondary air stream is laminar and joins the primary air stream in the upper section of the sleeve (5). The combined stream is then channelled towards the atmosphere by the baffle (8).

The examples which follow demonstrate the advantages of the process according to the invention and of the use of the device described above.

EXAMPLES 1 TO 3

The device shown in the attached single FIGURE, fitted with a 150 mm diameter, 0.8 mm gap die, was used to extrude low density polyethylenes produced by a radical route and whose melt index (MI), measured according to ASTM standard D 1238-73 and expressed in dg/min, and density (d) are shown in table 1. The blow-up ratio (ratio of the tube diameter in the third cooling stage to that of the die) is equal to 2.

Table 1 also shows:

the volume ratio V of the induced secondary air stream to the primary air stream, the polyethylene throughput Q (expressed in kg/h)

The tubes obtained are free from optical faults.

The following have been measured on the films obtained:

the thickness profile (T), expressed in micrometers, and the impact strength $S_i$, measured according to NFT standard 54109 and expressed in grammes.

TABLE I

| Example | Ldpe MI | D | V | Q | T | $S_i$ |
|---|---|---|---|---|---|---|
| 1 | 2.1 | 0.923 | 0.1 | 66 | 28 ± 3 | 107 |
| 2 | 0.6 | 0.922 | 0.04 | 109 | 32 ± 4 | 207 |
| 3 | 0.26 | 0.922 | 0.04 | 110 | 30 ± 5 | 197 |

COMPARATIVE EXAMPLES 4 TO 6

The same polyethylenes as in examples 1 to 3, respectively, were converted into tubes by using the device described in the document EP-A No. 0,130,909 in example 13, with a blow-up ratio of 2.

The data used and the results obtained are shown in table II.

TABLE II

| Example | V | Q | T | $S_i$ |
|---|---|---|---|---|
| 4 | 0.29 | 132 | 30 ± 5 | 67 |
| 5 | 0.26 | 102 | 35 ± 10 | 101 |
| 6 | 0.26 | 108 | 32 ± 7 | 85 |

The process and the device according to the invention make it possible, when compared with the device of document EP-A No. 0,130,909, to obtain a film which has a more uniform thickness profile and an improved impact strength, while retaining the good film optical properties.

These results are obtained by means of a device which, while being lower in height, makes it possible to attain higher linear product output rates at a constant mass throughput; the tube obtained is therefore thinner. These linear output rates may be increased further by increasing the height of the sleeves (5) and (6).

EXAMPLE 7

With the same device as in examples 1 to 3, a radical low density polyethylene having a melt index of 0,42 dg/min and a density of 0,922 g/cm³ and marketed under the name of LOTRENE FX 429 by the firm CdF CHIMIE E.P. was converted into a 30 μm tubular web. The film obtained, which has a very regular thickness profile, possesses an optical haze (measured according to ASTM Standard D 1003) of only 2%.

For comparison, the same polyethylene was converted into a tube by using the well-known cooling device in which air under pressure is blown directly at the exit of the tubular die. The film obtained has an optical haze of 6%.

What is claimed is:

1. A process for cooling a tubular sleeve produced by hot extrusion-blowing of a thermoplastic material through an annular die, said tubular sleeve being in the shape of a cylinder having a diameter substantially equal to that of said die at a first stage, in the shape of a conical frustum at a second stage, and in the shape of a cylinder having the same axis as the cylinder of the first stage and a diameter greater than the cylinder of the first stage at a third stage, said process comprising the steps of:

flowing a stream of primary air under pressure substantially parallel to and spaced from said tubular sleeve at said first stage, said stream of primary air reaching said tubular sleeve at said second stage; and flowing a stream of secondary air proximate to and along said tubular sleeve at said first stage, said stream of secondary air being in flow communication with the atmosphere and being induced by said stream of primary air and flowing substantially parallel and proximate to said tubular sleeve at said first stage, said stream of secondary air being substantially laminar over most of its path.

2. The process according to claim 1, wherein said stream of secondary air is laminar over at least 80% of its path.

3. The process according to claim 1, wherein the volume ratio of said secondary air stream to said primary air stream is between 0.01 and 0.2.

4. The process according to claim 1, wherein said process further includes the step of:
channelling a combined stream of air comprised of said stream of primary air and said stream of secondary air towards said tubular sleeve at said third stage.

5. A device for cooling a tubular sleeve produced by hot extrusion-blowing of a thermoplastic material through an annular die provided at the end of an extruding means, said device comprising:
a first cylindrical sleeve member coaxially aligned with said die, said first sleeve member and said tubular sleeve defining a secondary air flow space;
a second cylindrical sleeve member coaxially aligned with said first sleeve member and having a diameter greater than said first sleeve member, said first and second sleeve members defining a primary air flow space therebetween and having upper ends disposed to direct air at said tubular sleeve at a location at which the diameter of said tubular sleeve increases to prevent said tubular sleeve from falling under the action of gravity;
a cyclindrical ring comprising at least one orifice having an adjustable opening, said ring being disposed proximate to and coaxially aligned with said die to direct air into said secondary air flow space proximate to said die;
a source of pressurized air; and
means for flow communicating said source of pressurized air and said primary air flow space, the flow of pressurized air through said primary air flow space inducing a flow of air through said secondary air flow space, said induced flow of air being substantially parallel to and along said tubular sleeve.

6. The device according to claim 5, wherein at least one of said first and second sleeve members is comprised of a plurality of sections.

7. The device according to claim 6, wherein said sections are cylinders that fit into each other.

8. The device according to claim 5, 6 or 7, wherein at least one of said first and second sleeve members is provided with a means for opening said sleeve member along a generatrix.

9. The device according to claim 5 or 6, wherein the first and second sleeve members have upper ends and the upper end of at least one of said first and second sleeve members is in the shape of an upwardly widening conical frustum.

10. The device according to claim 5 or 6, wherein the upper end of said second sleeve member is disposed at a height higher than the height at which the upper end of said first sleeve member is disposed.

11. The device according to claim 5 wherein the second sleeve member has an upper portion further comprising:
a baffle disposed on the upper portion of said second sleeve member.

12. The device according to claim 11, wherein said baffle is comprised of a succession of cylindrical rings having increasing diameters, said succession of rings being coaxially aligned with said die and being connected to each other and to the upper portion of said second sleeve member by at least two fastening straps.

* * * * *